United States Patent
Oishi et al.

(10) Patent No.: US 11,565,656 B2
(45) Date of Patent: Jan. 31, 2023

(54) AUTHENTICATION SYSTEM AND AUTHENTICATION METHOD

(71) Applicant: KABUSHIKI KAISHA TOKAI RIKA DENKI SEISAKUSHO, Aichi (JP)

(72) Inventors: Yoshiki Oishi, Aichi (JP); Kenichi Koga, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/426,176

(22) PCT Filed: Jan. 30, 2020

(86) PCT No.: PCT/JP2020/003424
§ 371 (c)(1),
(2) Date: Jul. 28, 2021

(87) PCT Pub. No.: WO2020/158860
PCT Pub. Date: Aug. 6, 2020

(65) Prior Publication Data
US 2022/0097651 A1    Mar. 31, 2022

(30) Foreign Application Priority Data
Feb. 1, 2019   (JP) .............................. JP2019-017083

(51) Int. Cl.
*B60R 25/24* (2013.01)
*B60R 25/25* (2013.01)
*H04W 4/02* (2018.01)

(52) U.S. Cl.
CPC .............. *B60R 25/24* (2013.01); *B60R 25/25* (2013.01); *H04W 4/025* (2013.01)

(58) Field of Classification Search
CPC ......... H04W 4/025; B60R 25/25; B60R 25/24
See application file for complete search history.

(56) References Cited

U.S. PATENT DOCUMENTS

| 6,100,811 A * | 8/2000 | Hsu ..................... B60R 25/2081 340/426.36 |
| 6,868,170 B1 * | 3/2005 | Fuku .................... B60R 25/252 340/5.53 |

(Continued)

FOREIGN PATENT DOCUMENTS

| JP | 2017-115439 | 6/2017 |
| JP | 2018-062306 | 4/2018 |

OTHER PUBLICATIONS

International Search Report issued in International Patent Application No. PCT/JP2020/003424, dated Mar. 24, 2020, along with an English translation thereof.

*Primary Examiner* — Thomas D Alunkal

(74) *Attorney, Agent, or Firm* — Greenblum & Bernstein, P.L.C.

(57) ABSTRACT

An authentication system includes a terminal and a key authentication unit arranged in a communication peer that communicates with the terminal. The key authentication unit receives key information of the terminal carried by a user through wireless communication and performs key authentication that verifies authenticity of the key information. The authentication system further includes detectors that are arranged at different locations and detect biological information of the user and a biometric authentication unit that uses the biological information to perform biometric authentication. The authentication system further includes a controller that controls actuation of the communication peer based on a location of one of the detectors that detected the biological information, an authentication result of the key authentication, and an authentication result of the biometric authentication.

4 Claims, 3 Drawing Sheets

(56) References Cited

U.S. PATENT DOCUMENTS

| | | | | |
|---|---|---|---|---|
| 2006/0294393 A1* | 12/2006 | McCall | ................ | H04L 9/3231 |
| | | | | 713/186 |
| 2008/0048829 A1* | 2/2008 | Nakajima | ............. | B60R 25/245 |
| | | | | 340/426.36 |
| 2010/0148923 A1* | 6/2010 | Takizawa | .............. | B60R 25/252 |
| | | | | 340/5.82 |
| 2014/0368313 A1* | 12/2014 | Seiberts | ............. | G07C 9/00309 |
| | | | | 340/5.61 |
| 2018/0105137 A1* | 4/2018 | Kawamura | ........ | G07C 9/00563 |

\* cited by examiner

AUTHENTICATION SYSTEM AND AUTHENTICATION METHOD

TECHNICAL FIELD

The present invention relates to an authentication system and an authentication method for performing authentication through wireless communication.

BACKGROUND ART

A known authentication system of a vehicle controls the vehicle through wireless communication between a terminal carried by a user and an onboard device of the vehicle. Patent Document 1 discloses a technique for verifying the authenticity of a terminal through wireless communication between an onboard device and the terminal and identifying a user through biometric authentication based on the biological information of the user. Biometric authentication will improve the security of the authentication system.

Patent Document 1: Japanese Laid-Open Patent Publication No. 2018-62306

SUMMARY

There is a need to detect where a user is located relative to a vehicle during biometric authentication to perform control operations based on the user position.

It is an objective of the present invention to provide an authentication system and an authentication method for performing control based on the user position while improving security.

In an embodiment, an authentication system includes a terminal, a key authentication unit arranged in a communication peer that communicates with the terminal, in which the key authentication unit receives key information of the terminal carried by a user through wireless communication and performs key authentication that verifies the authenticity of the key information, detectors that are arranged at different locations and detect biological information of the user, a biometric authentication unit that uses the biological information to perform biometric authentication, and a controller that controls actuation of the communication peer based on a location of one of the detectors that detected the biological information, an authentication result of the key authentication, and an authentication result of the biometric authentication.

In an embodiment, an authentication method includes transmitting key information of a terminal carried by a user to a communication peer and performing key authentication that verifies the authenticity of the key information, detecting biological information of the user with at least one of detectors arranged at different locations, performing biometric authentication using the biological information, and controlling actuation of the communication peer based on a location of one of the detectors that detected the biological information, an authentication result of the key authentication, and an authentication result of the biometric authentication.

Effects of the Invention

The authentication system and the authentication method of the present invention perform control operations based on the user position while improving security.

DESCRIPTION OF THE EMBODIMENTS

First Embodiment

An authentication system and an authentication method according to a first embodiment will now be described with reference to FIGS. 1 and 2.

Figure 1:
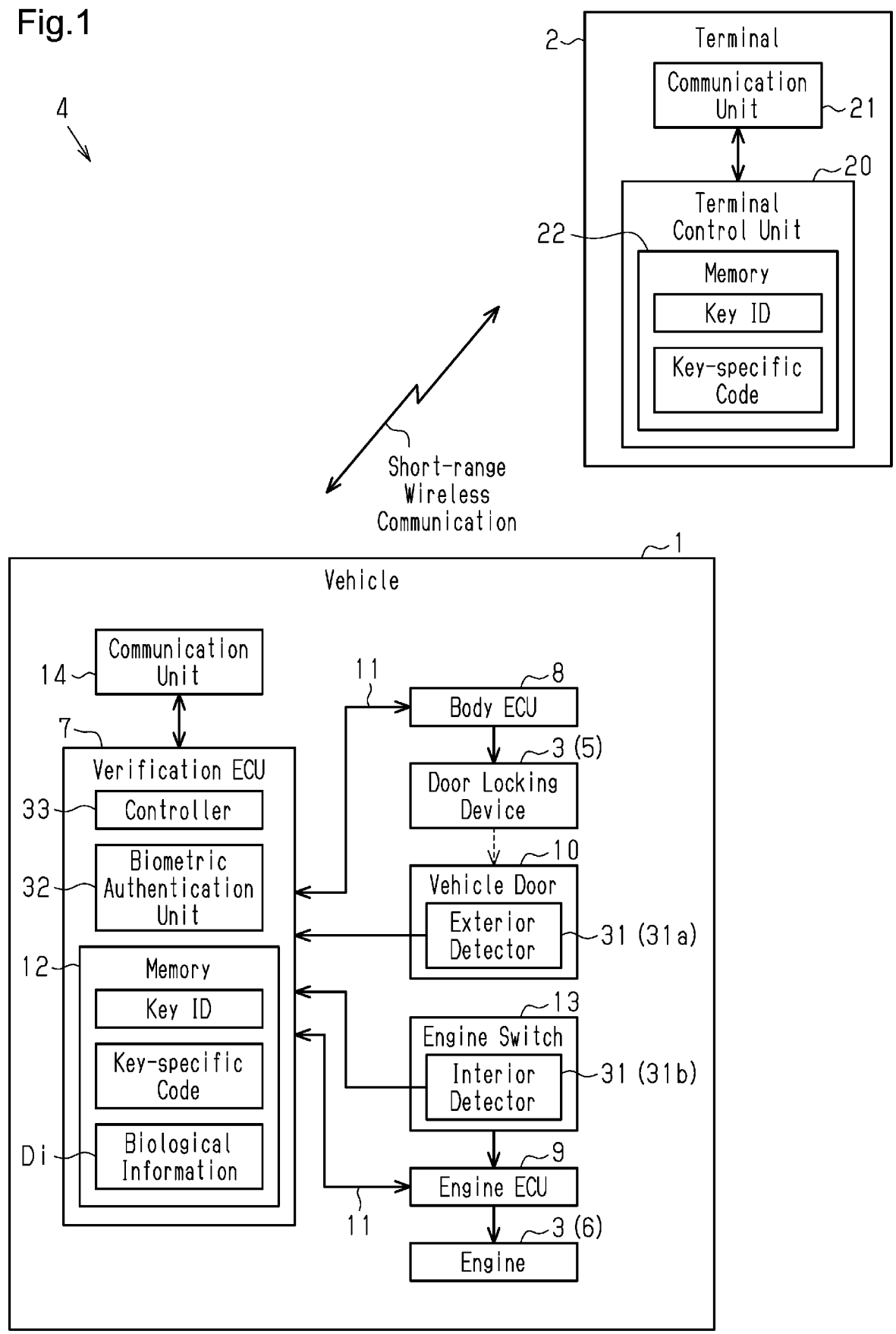
FIG. 1 is a block diagram illustrating the structure of an authentication system.

As shown in FIG. 1, a vehicle 1 serving as a communication peer includes an authentication system 4 that identifies a terminal 2 through short-range wireless communication to control actuation of an onboard device 3. The terminal 2 is preferably a smartphone, which is a high-performance mobile phone having telephone functionality and being capable of performing communication with the vehicle 1 through short-range wireless communication. Preferably, the short-range wireless communication is, for example, Bluetooth (registered trademark) communication.

The authentication system 4 of the present example is a system that verifies short-range wireless communication by performing ID verification through short-range wireless communication in response to communication from the vehicle 1. The ID verification performed between the vehicle 1 and the terminal 2 will be described as key authentication. Examples of the onboard device 3 include a door locking device 5 and an engine 6 of the vehicle 1. The door locking device 5 controls the locking and unlocking of vehicle doors.

The vehicle 1 includes a verification ECU 7, which serves as a key authentication unit that performs key authentication, a body ECU 8, which manages the power source of onboard electric components, and an engine ECU 9, which controls the engine 6. The body ECU 8 controls the operation of the door locking device 5 that locks and unlocks a vehicle door 10. The ECUs are connected to one another through an interior communication line 11. Examples of the communication line 11 include a controller area network (CAN) and a local interconnect network (LIN).

The verification ECU 7 includes a memory 12 that stores the key ID of the terminal 2 registered in the vehicle 1 and a key-specific code. The key ID and the key-specific code correspond to key information. The key ID and the key-specific code are used for key authentication. The authentication system 4 automatically performs a series of key authentication processes through mutual communication between the verification ECU 7 and the terminal 2. The memory 12 stores biological information Di of a user used for biometric authentication. In the present example, the biological information Di is stored in association with the key ID.

The vehicle 1 includes an engine switch 13 that shifts the power supply status of the engine 6. Preferably, the engine switch 13 is, for example, a push switch. The engine ECU 9 controls the power supply state shifting of the engine 6 when the engine switch 13 is operated under a situation in which a predetermined condition is satisfied. The predetermined condition may be a condition in which key authentication has been accomplished, a condition in which a user carrying the terminal 2 is inside the passenger compartment, a condition in which the braking pedal of the vehicle 1 is being depressed, a condition in which gearshift lever of the vehicle 1 is in the parking position, or a combination of these conditions.

The vehicle 1 includes a communication unit 14 that performs short-range wireless communication with the terminal 2. The communication unit 14 of the present example performs Bluetooth Low Energy (BLE) communication with the terminal 2. The terminal 2 is the master device and the vehicle 1 is the slave device in the short-range wireless communication of the present example. Instead, the vehicle 1 may be the master device and the terminal 2 may be the slave device.

The terminal 2 includes a terminal control unit 20, which controls the operation of the terminal 2, and a communication unit 21, which performs short-range wireless communication with the vehicle 1. The terminal control unit 20 includes a memory 22 that stores the key ID of the terminal 2 and the key-specific code.

When the terminal 2 is used as an electronic key (vehicle key) to the vehicle 1, the terminal 2 performs electronic key registration to register the key ID of the terminal 2 and the key-specific code in the vehicle 1. For example, the terminal 2 obtains the key ID and the key-specific code from a server (not shown) through network communication and stores the key ID and the key-specific code in the memory 22. Then, the terminal 2 is connected to the vehicle 1 through BLE communication to transmit the key ID of the terminal 2 and the key-specific code to the vehicle 1 for registration. The biological information Di of the user corresponding to the key ID is also registered in the vehicle 1.

The vehicle 1 and the terminal 2 automatically perform communication connection in accordance with a series of communication connection processes following a BLE communication advertising packet. In the present example, the communication unit 14 of the vehicle 1 periodically transmits an advertising packet to an area proximate to the vehicle 1. When the terminal 2 enters the proximate area of the vehicle 1 and receives the advertising packet, the vehicle 1 and the terminal 2 establish connection with each other through BLE communication. The vehicle 1 and the terminal 2, which are connected through BLE communication, automatically perform key authentication by communicating with each other through BLE communication. The processes of key authentication are automatically executed without the user operating the terminal 2 or the vehicle 1.

The authentication system 4 includes detectors 31 that detect the biological information Di of the user. The detectors 31 of the present example include an exterior detector 31a, which is arranged on the exterior door handle of the vehicle door 10, and an interior detector 31b, which is arranged on the engine switch 13. Examples of the detectors 31 include a fingerprint sensor that detects, for example, the fingerprint of the user. The detectors 31 are connected to the verification ECU 7. The detectors 31 detect and output the biological information Di to the verification ECU 7.

The authentication system 4 includes a biometric authentication unit 32 that uses the biological information Di to perform biometric authentication. The biometric authentication unit 32 of the present example is arranged in the verification ECU 7. The biometric authentication unit 32 receives the biological information Di from one of the detectors 31 to perform biometric authentication by comparing the received biological information Di with the biological information Di that is registered in advance. The biometric authentication unit 32 determines whether the biological information Di is associated with the key ID. The biometric authentication unit 32 determines that biometric authentication is accomplished when determining that the biological information Di was provided by the authorized user.

The biometric authentication unit 32 detects the position of the user (hereafter, user position) who is operating the vehicle 1 from the location of where the detector 31 that detected the biological information Di is arranged. In the present example, the location of the detector 31 is associated in advance with the user position. When detecting the user position, the location of the detector 31 that receives the biological information Di is recognized as the user position.

The authentication system 4 includes a controller 33 that controls the actuation of the onboard device 3. The controller 33 controls the actuation of the onboard device 3 based on the location of the detector 31 that detected the biological information Di, an authentication result of key authentication, and an authentication result of biometric authentication. For example, the controller 33 permits or performs the actuation of the door locking device 5, that is, the locking or unlocking of the vehicle door 10, if the key authentication and the biometric authentication are accomplished when the user position is outside the passenger compartment. The controller 33 also permits or performs the starting of the engine 6 if the key authentication and the biometric authentication are accomplished when the user position is inside the passenger compartment.

The operation and advantages of the authentication system 4 will now be described with reference to FIG. 2. In this case, the terminal 2 has completed electronic key registration, and the vehicle 1 and the terminal 2 have established connection with each other through BLE communication.

Figure 2:
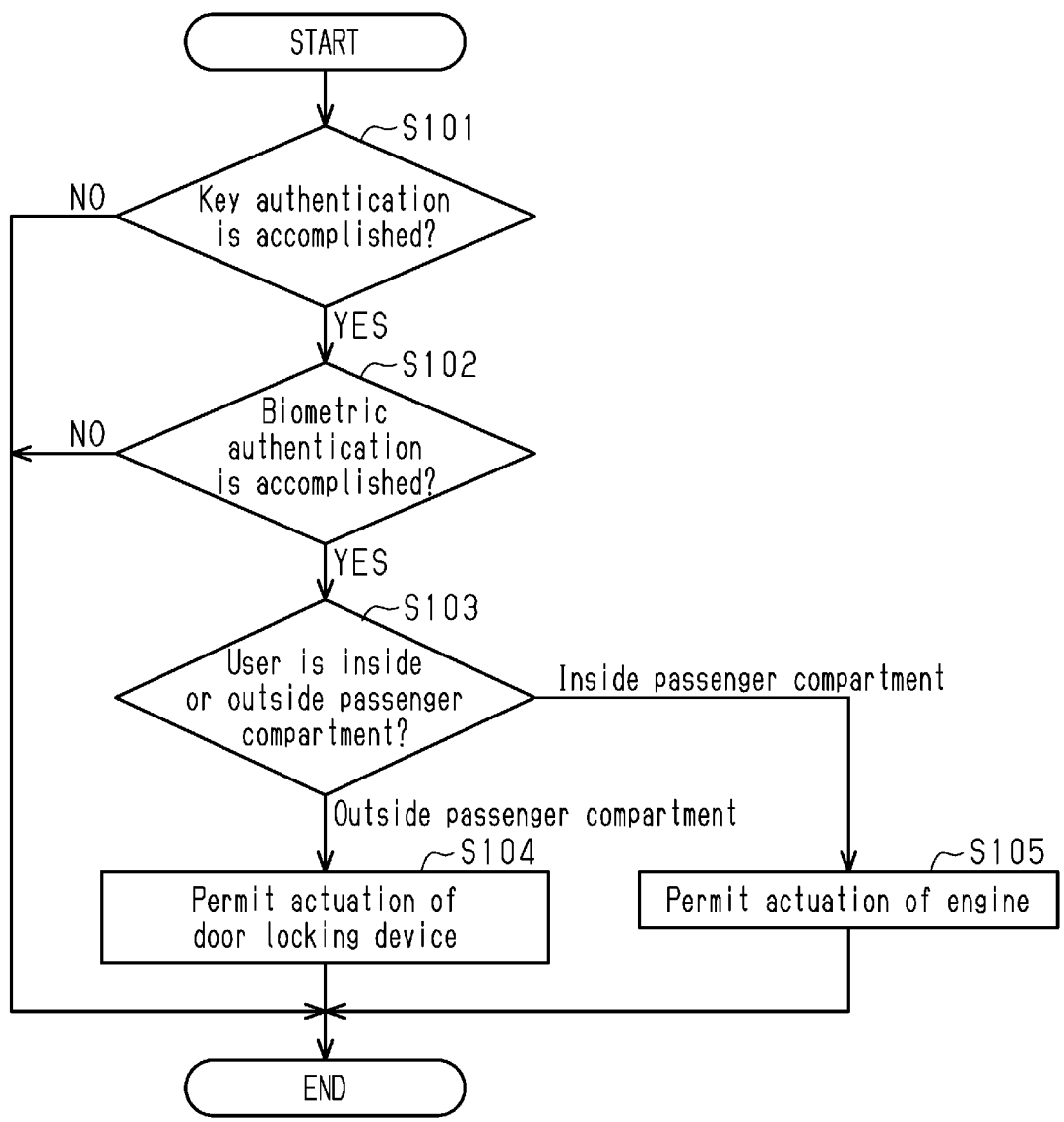
FIG. 2 is a flowchart showing an authentication procedure.

After the vehicle 1 and the terminal 2 are connected and BLE communication is established, the verification ECU 7 performs key authentication on the terminal 2 in S101 (S refers to step) as shown in FIG. 2. In the key authentication, for example, the terminal control unit 20 transmits the key ID to the verification ECU 7. The verification ECU 7 verifies the key ID and uses the key-specific code to perform encryption authentication such as challenge-response authentication. The verification ECU 7 determines that the key authentication is accomplished when the key ID is verified and encryption authentication is accomplished. The verification ECU 7 proceeds to S102 when the key authentication is accomplished. In contrast, the verification ECU 7 ends the process and prohibits the actuation of the onboard device 3 when the key authentication is not accomplished.

In S102, the biometric authentication unit 32 of the verification ECU 7 performs biometric authentication. The biometric authentication unit 32 compares the biological information Di that was detected by the detector 31 with the biological information Di that was registered in advance and checks whether the information match. In this case, the biometric authentication unit 32 determines whether the biological information Di is associated with the key ID used for key authentication. The biometric authentication unit 32 determines that the biometric authentication is accomplished when the detected biological information Di corresponds to the registered biological information Di and is associated with the key ID. The verification ECU 7 proceeds to S103 when the biometric authentication unit 32 determines that the biometric authentication is accomplished. In contrast, the verification ECU 7 ends the process and prohibits the actuation of the onboard device 3 when the biometric authentication is not accomplished.

In S103, the biometric authentication unit 32 determines whether the user position is inside or outside the passenger compartment. The biometric authentication unit 32 determines the user position based on which one of the detectors 31 received the biological information Di during biometric authentication. In the present example, the biometric authentication unit 32 determines that the user position is outside the passenger compartment when receiving the biological information Di from the exterior detector 31a. The biometric authentication unit 32 determines that the user position is inside the passenger compartment when receiving the biological information Di from the interior detector 31b. The verification ECU 7 proceeds to S104 when the user position is outside the passenger compartment. The verification ECU 7 proceeds to S105 when the user position is inside the passenger compartment.

The controller 33 of the verification ECU 7 permits the actuation of the door locking device 5 in S104 when the user position is outside the passenger compartment on condition that the key authentication and the biometric authentication have been accomplished. In this manner, the locking and unlocking of the vehicle door 10 are enabled when the user carrying the authorized terminal 2 has the exterior detector 31a, which is arranged on the exterior door handle of the vehicle door 10, read his or her fingerprint.

The controller 33 permits the starting of the engine 6 in S105 when the user position is inside the passenger compartment on condition that the key authentication and the biometric authentication have been accomplished. Thus, the engine ECU 9 controls the power supply state shifting of the engine 6 when the engine switch 13 is pushed, on the condition in which the user position is inside the passenger compartment. In this manner, the determination of whether the user position is outside or inside the passenger compartment allows for control based on the location of the user.

In the present example, the authentication system 4 includes the detectors 31 that are arranged at different locations and detect the biological information Di of the user, and the biometric authentication unit 32 that performs biometric authentication based on the detected biological information Di. The authentication system 4 also includes the controller 33 that controls the actuation of the vehicle 1 based on the location of the detector 31 that detected the biological information Di, the authentication result of key authentication, and the authentication result of biometric authentication. With this structure, the biometric authentication does not permit a person other than the authorized user to actuate the vehicle 1. Further, the location of the detector 31 determines the location of the user operating the vehicle 1, which allows for controlling the vehicle 1 in accordance with the user position. This controls the vehicle 1 based on the user position while improving security.

In the present example, the detectors 31 are arranged inside and outside the passenger compartment of the vehicle 1. This configuration allows for accurate determination of whether the user is located inside or outside the passenger compartment. Further, this configuration can be applied when changing control based on whether the user is located inside or outside the passenger compartment.

In the present example, the controller 33 permits the actuation of the vehicle 1 only when the combination of the key ID used for key authentication and the biological information Di used for biometric authentication match the combination of the key ID and biological information Di that are associated with each other in advance. This structure determines whether the terminal 2 and the user is a valid combination and improves security.

Second Embodiment

An authentication system and an authentication method according to a second embodiment will now be described with reference to FIGS. 3 and 4. The second embodiment differs from the first embodiment in that the second embodiment performs terminal position detection to detect a terminal position relative to the vehicle 1 during key authentication. Thus, the same reference numerals are given to those components that are the same as the corresponding components of the first embodiment. Such components will not be described in detail. The description will focus on the differences from the first embodiment.

The verification ECU 7 performs terminal position detection during key authentication. Thus, the verification ECU 7 of the present example also serves as a terminal position detector. However, the terminal position detector may be arranged separately from the verification ECU 7 (key authentication unit). In terminal position detection, the verification ECU 7 detects the location of the terminal 2 relative to the vehicle 1 based on a parameter obtained from radio waves transmitted and received between the vehicle 1 and the terminal 2. Examples of the parameter include the reception strength, the phase difference, the propagation time, the traveling direction of radio waves, and a combination of parameters. In the present example, the verification ECU 7 obtains the reception strength as a parameter when radio waves are transmitted by one of the vehicle 1 and the terminal 2 and received by the other one of the vehicle 1 and the terminal 2. The verification ECU 7 determines which one of the areas of the vehicle 1 the terminal position is in based on the obtained reception strength. The controller 33 controls the actuation of the vehicle 1 based on the user position detected during biometric authentication, which is described above, and the terminal position detected during key authentication.

Figure 3:
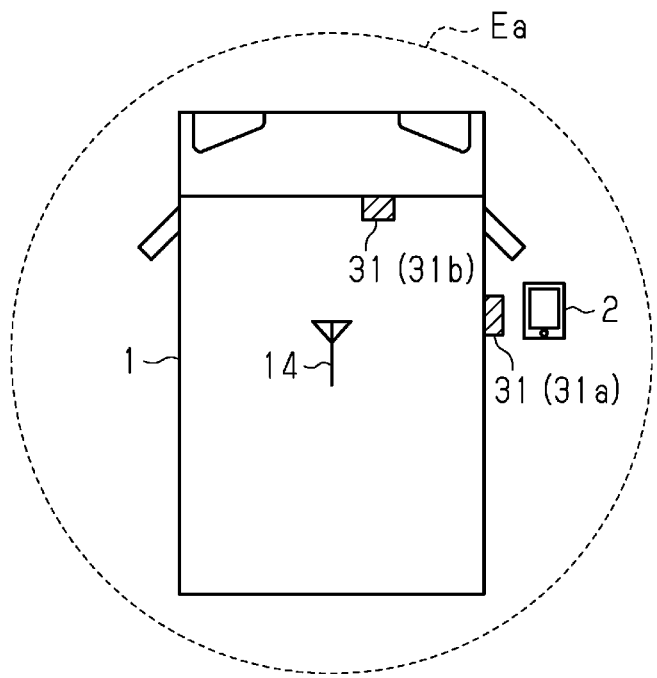
FIG. 3 is a diagram illustrating an exterior area for terminal position detection in a second embodiment.

As shown in FIG. 3, the verification ECU 7 determines whether the terminal position is inside an exterior area Ea, which is outside the passenger compartment of the vehicle 1, based on the reception strength. The controller 33 determines that the terminal position is inside the exterior area Ea when the reception strength is, for example, within a predetermined range.

Figure 4:
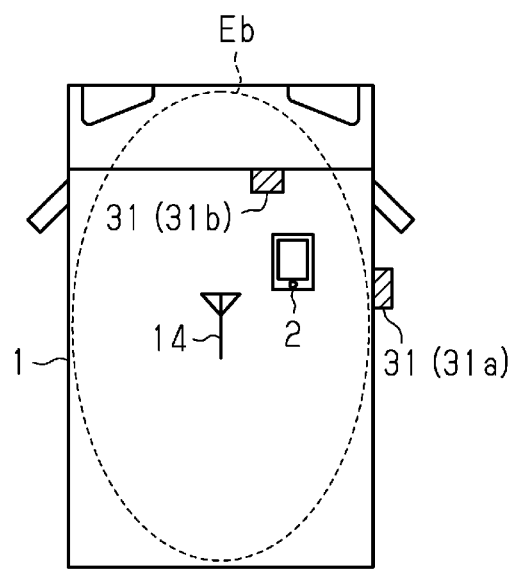
FIG. 4 is a diagram illustrating an interior area for terminal position detection in the second embodiment.

As shown in FIG. 4, the controller 33 determines whether the terminal position is inside an interior area Eb, which is inside the passenger compartment of the vehicle 1, based on the reception strength. The controller 33 determines that the terminal position is inside the interior area Eb when the reception strength is, for example, greater than or equal to a predetermined threshold value. If the communication unit 14 is arranged inside the passenger compartment, the reception strength of radio waves received by the terminal 2 is greater when the terminal 2 is located inside the passenger compartment than when the terminal 2 is located outside the passenger compartment.

The controller 33 permits actuation of the door locking device 5 when the user position is outside the passenger compartment and the terminal position is inside the exterior area Ea on condition that key authentication and biometric authentication have been accomplished. The controller 33 also permits starting of the engine 6 when the user position is inside the passenger compartment and the terminal position is inside the interior area Eb on condition that key authentication and biometric authentication have been accomplished. The controller 33 prohibits actuation of the onboard device 3 when the user position is outside the passenger compartment and the terminal position is inside the interior area Eb. The controller 33 also prohibits actuation of the onboard device 3 when the user position is inside the passenger compartment and the terminal position is inside the exterior area Ea.

Accordingly, in the present example, during key authentication, the terminal position detector (verification ECU 7) detects the terminal position relative to the vehicle 1 based on a parameter obtained from radio waves transmitted and received between the terminal 2 and the vehicle 1. The controls the actuation of the vehicle 1 based on the user position and the terminal position. This configuration detects the terminal position in addition to the user position. Thus, actuation of the vehicle 1 is controlled in accordance with the user position and the terminal position. Further, by prohibiting the actuation of the door locking device 5 when the terminal 2 is located inside the passenger compartment, the user will be prevented from forgetting the terminal 2 in the passenger compartment.

A case in which biometric authentication is not performed and only key authentication including terminal position detection is performed to attempt to operate the vehicle 1 will now be described. In this case, regarding the terminal position detection, a fraudulent act may be performed to provide a falsified terminal position by using an unauthorized communication device to relay radio waves and copy or change information of the terminal position. Such a fraudulent act is performed by arranging the unauthorized communication device in the vicinity of the vehicle 1 or the terminal 2 to accomplish authentication between the vehicle 1 and the terminal 2, which are far from each other. However, the present example requires biometric authentication in addition to the key authentication including terminal position detection so that the actuation of the vehicle 1 is not permitted in the unauthorized activities.

The above-described embodiments may be modified as follows. The above-described embodiments and the following modifications can be combined as long as the combined modifications remain technically consistent with each other.

Authentication System

In each embodiment, the vehicle 1 and the terminal 2 may be paired in any manner when establishing connection in the short-range wireless communication. For example, one of the devices may be solely operated to perform pairing. Further, when the vehicle 1 is operated for pairing, a device such as a car navigation system, which is installed on the vehicle 1, may be used as an input and output device. That is, any operation device, operation method, and authentication method may be used for pairing.

In each embodiment, the vehicle 1 and the terminal 2 do not need to be connected automatically during short-range wireless communication. For example, at least one of the vehicle 1 or the terminal 2 may be operated to perform short-range wireless communication.

In each embodiment, there is no particular limit to the location and quantity of the communication unit 14.

In each embodiment, the communication protocol and the bandwidth of the authentication system 4 are not limited to Bluetooth communication. Instead, Wi-Fi (registered trademark) or the ultrawide band (UWB) may be used.

In each embodiment, the terminal 2 is not limited to a smartphone and may be a terminal, which serves as a key and is associated with the vehicle 1.

In each embodiment, the authentication system 4 is not limited to the vehicle 1 and may be modified for application to various types of machines or devices. That is, a communication peer of the terminal 2 is not limited to the vehicle 1. Instead, the above embodiment may be applied to a building or the like in place of the vehicle 1.

Key Authentication

In the second embodiment, the terminal position detection during key authentication does not need to detect whether the terminal position is inside or outside the passenger compartment of the vehicle 1. For example, the terminal position detection may detect whether the terminal 2 is located at the driver seat side or the passenger seat side of the vehicle 1 or whether the terminal 2 is located at the front side or the rear side of the vehicle 1. Alternatively, the terminal position detection may detect the coordinates of the terminal 2 relative to the vehicle 1.

In the second embodiment, the terminal position detection during key authentication may be performed in any manner. As described above, examples of a parameter include the reception strength, the phase difference, the propagation time, the traveling direction of radio waves, and a combination of parameters.

In the second embodiment, communication in the terminal position detection may use radio waves in the ultrawide band (UWB). That is, the communication protocol and the bandwidth in the terminal position detection are not limited to the above example.

In the second embodiment, communication for the terminal position detection may be performed at a time differing from communication for verifying the authenticity of key information.

In the second embodiment, the terminal position detection and the verification of the authenticity of key information may be performed in any order. The terminal position detection may be performed before, after, or during the verification of the authenticity of key information.

In the second embodiment, the terminal position detection and the verification of the authenticity of key information may use different communication protocols and bandwidths. For example, the verification of the authenticity of key information may be performed in low frequency (LF)-ultrahigh frequency (UHF) communication, and the terminal position detection may be performed in Bluetooth communication.

In each embodiment, the electronic key of the terminal 2 may be registered in any manner. For example, the terminal 2 does not need to obtain the key ID and the key-specific code from a server through network communication. The terminal 2 may log into the vehicle 1 using a user ID and password authentication through BLE communication and obtain the key ID and the key-specific code registered in the vehicle 1 in advance.

In each embodiment, key information is not limited to the key ID and the key-specific code.

In each embodiment, key authentication does not require challenge-response authentication that uses the verification of the key ID and the key-specific code. Instead, key authentication may be performed in any manner as long as the authenticity of the terminal 2 is verified.

In each embodiment, key authentication does not need to be automatically performed. Instead, at least one of the vehicle 1 or and the terminal 2 may be operated to perform key authentication.

Biometric Authentication

In each embodiment, the determination of whether the key ID is associated with the biological information Di may be performed separately from biometric authentication. Thus, biometric authentication may be accomplished even when the key ID is not associated with the biological information Di.

In each embodiment, the detection of a user position during biometric authentication is not limited to detection of whether the user position is outside or inside the passenger compartment of a communication peer.

In each embodiment, the biological information Di may be registered in any manner. The biological information Di may be registered when the electronic key is registered, or the biological information Di may be registered by a specific operation of the terminal 2 or the vehicle 1 following the registration of the electronic key. The terminal 2 may include a fingerprint reader to register the biological information Di.

In each embodiment, the biological information Di is not limited to a fingerprint. The biological information Di may be a voice, a fingerprint, an iris, a face, or a combination of these biometric identifiers.

In each embodiment, biometric authentication may be performed before, after, or during the key authentication.

Detector

In each embodiment, the detector 31 may store the location of the detector 31 and the user position and output the stored information when detecting the biological information Di.

In each embodiment, the detectors 31 do not need to be arranged inside and outside the passenger compartment of the vehicle 1. Instead, the detectors 31 may be arranged at different locations outside the passenger compartment, or the detectors 31 may be arranged at different locations inside the passenger compartment. That is, the location determination units 31 may be arranged at any locations.

In each embodiment, the number of the detectors 31 may be two, three, or more than three.

In each embodiment, the terminal 2 may include the detector 31. For example, the exterior detector 31a may be arranged on the terminal 2.

In each embodiment, the detectors 31 and the verification ECU 7 may be wire-connected or wirelessly connected.

In each embodiment, the detectors 31 are not limited to fingerprint sensors. Instead, the detectors 31 may be modified in accordance with specifications.

Biometric Authentication Unit

In each embodiment, the biometric authentication unit 32 may identify one of the detectors 31 that receives the biological information Di in any manner. For example, the biometric authentication unit 32 may identify the detectors 31 using input ports that differ for each detector 31. Alternatively, the detectors 31 may output identification information.

In each embodiment, the biometric authentication unit 32 does not need to determine the user position. Instead, the controller 33 may determine the user position. For example, the controller 33 may obtain the location of the detector 31 that detects the biological information Di.

Controller

In the second embodiment, the verification ECU 7 does not need to perform terminal position detection. Instead, any other device may perform terminal position detection.

In the second embodiment, the controller 33 may permit a predetermined actuation of the vehicle 1 when the user position and the terminal position are not consistent with each other. For example, a notification such as a speech or a display may indicate that the user position and the terminal position are not consistent with each other.

In each embodiment, the biometric authentication unit 32 determines whether the biological information Di is associated with the key ID. Instead, the controller 33 may determine whether the biological information Di is associated with the key ID in a manner separate from biometric authentication. That is, the actuation of the communication peer may be permitted only when the biological information Di is associated with the key ID.

In each embodiment, the determination of whether the biological information Di is associated with the key ID may be omitted.

The invention claimed is:

1. An authentication system, comprising:
a terminal;
a key authentication unit arranged in a vehicle that communicates with the terminal, wherein the key authentication unit receives key information of the terminal carried by a user through wireless communication and performs key authentication that verifies authenticity of the key information;
detectors that are arranged at different locations and detect biological information of the user;
a biometric authentication unit that uses the biological information to perform biometric authentication;
a terminal position detector that detects a terminal position relative to the vehicle based on a parameter obtained from radio waves transmitted and received between the terminal and the vehicle during the key authentication; and
a controller that controls actuation of the vehicle based on a location of one of the detectors that detected the biological information, the terminal position, an authentication result of the key authentication, and an authentication result of the biometric authentication,
wherein the terminal position detector detects whether the terminal is located at a driver seat side or a passenger seat side of the vehicle, or whether the terminal is located at a front side or a rear side of the vehicle, and
wherein the controller permits the actuation of the vehicle only when the key information used in the key authentication and the biological information used in the biometric authentication have been associated with each other in advance.

2. The authentication system according to claim 1, wherein the detectors are arranged inside and outside the vehicle.

3. The authentication system according to claim 1, wherein
the detectors include an exterior detector, which is arranged outside a passenger compartment of the vehicle, and an interior detector, which is arranged inside the passenger compartment of the vehicle,
the controller permits or performs locking or unlocking of a door of the vehicle if the key authentication is accomplished when the biometric authentication is accomplished with the biological information detected by the exterior detector, and
the controller permits or performs starting of an engine of the vehicle if the key authentication is accomplished when the biometric authentication is accomplished with the biological information detected by the interior detector.

4. An authentication method, comprising:
transmitting key information of a terminal carried by a user to a vehicle and performing key authentication that verifies authenticity of the key information;
detecting biological information of the user with at least one of detectors arranged at different locations;
performing biometric authentication using the biological information;
detecting a terminal position relative to the vehicle based on a parameter obtained from radio waves transmitted and received between the terminal and the vehicle during the key authentication; and controlling actuation of the vehicle based on a location of one of the detectors that detected the biological information, the terminal position, an authentication result of the key authentication, and an authentication result of the biometric authentication, wherein the detecting a terminal position includes whether the terminal is located at a driver seat side or a passenger seat side of the vehicle, or whether the terminal is located at a front side or a rear side of the vehicle, and wherein the controlling of the actuation of the vehicle includes permitting the actuation of the vehicle only when the key information used in the key authentication and the biological information used in the biometric authentication have been associated with each other in advance.

* * * * *